No. 687,211. Patented Nov. 26, 1901.
A. EDWARDS.
BEET HARVESTER.
(Application filed Aug. 10, 1901.)

(No Model.) 2 Sheets—Sheet 1.

Witnesses

Inventor
Arthur Edwards.
By O'Mara & Co.
Attorneys

THE NORRIS PETERS CO., PHOTO-LITHO., WASHINGTON, D. C.

No. 687,211. Patented Nov. 26, 1901.
A. EDWARDS.
BEET HARVESTER.
(Application filed Aug. 10, 1901.)
(No Model.) 2 Sheets—Sheet 2.
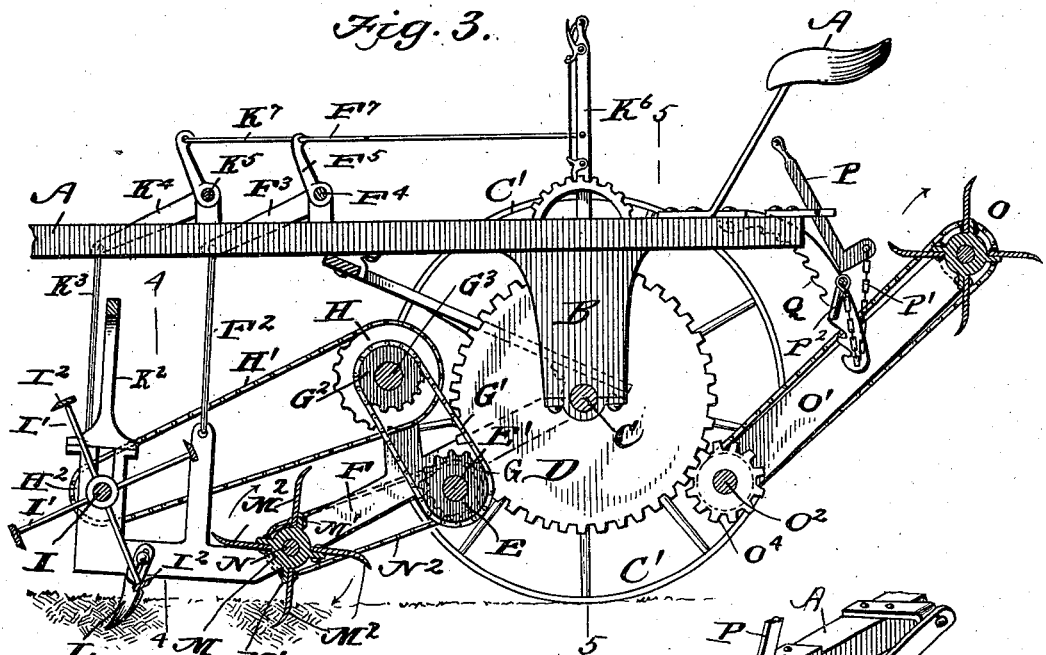
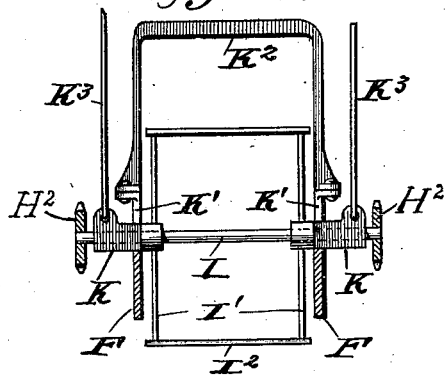
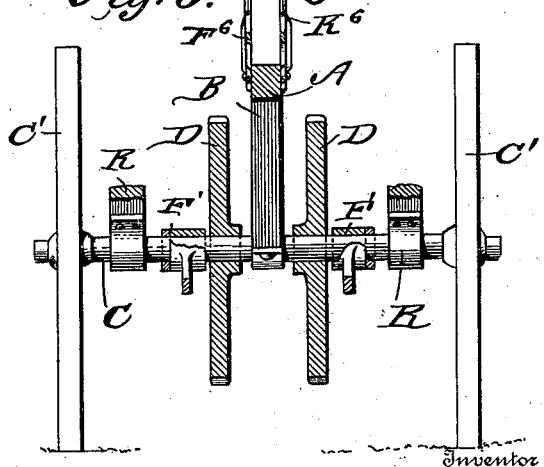
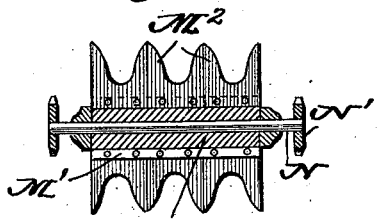
Inventor
Arthur Edwards.

UNITED STATES PATENT OFFICE.

ARTHUR EDWARDS, OF WILLIAMSVILLE, MISSOURI, ASSIGNOR OF ONE-HALF TO JOHN H. HARTY, OF MINGO, MISSOURI.

BEET-HARVESTER.

SPECIFICATION forming part of Letters Patent No. 687,211, dated November 26, 1901.

Application filed August 10, 1901. Serial No. 71,575. (No model.)

*To all whom it may concern:*

Be it known that I, ARTHUR EDWARDS, a citizen of the United States, residing at Williamsville, in the county of Wayne and State of Missouri, have invented a new and useful Improvement in Beet-Harvesters, of which the following is a specification.

This invention is an improved beet-harvester, the object being to provide a machine by means of which the beets can be first deprived of their tops and then extracted from the ground.

With these objects in view the invention consists, essentially, of a main frame adapted to carry a rotary cutter and one or more rotary hoes or diggers, the rotary cutter being vertically adjustable, the main frame being adjustable also to regulate the depth to which the hoe enters the earth, and means carried by the said frame for the purpose of simultaneously rotating the cutter and hoe; and the invention consists also in certain details of construction and novelties of combination, all of which will be fully described hereinafter and pointed out in the claims.

Figure 1:
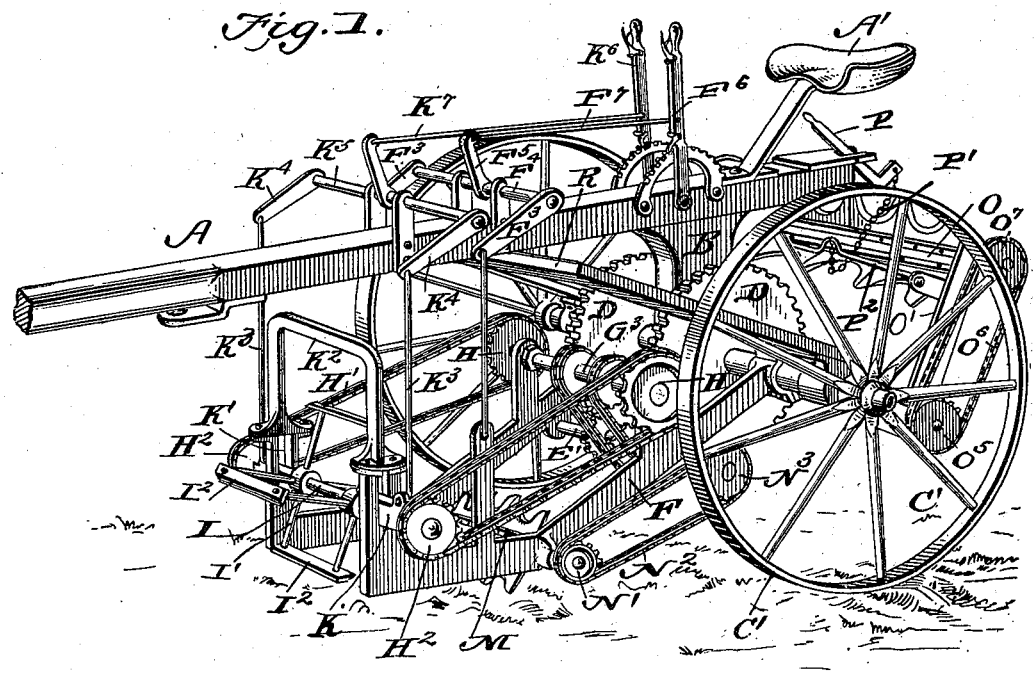
Figure 2:
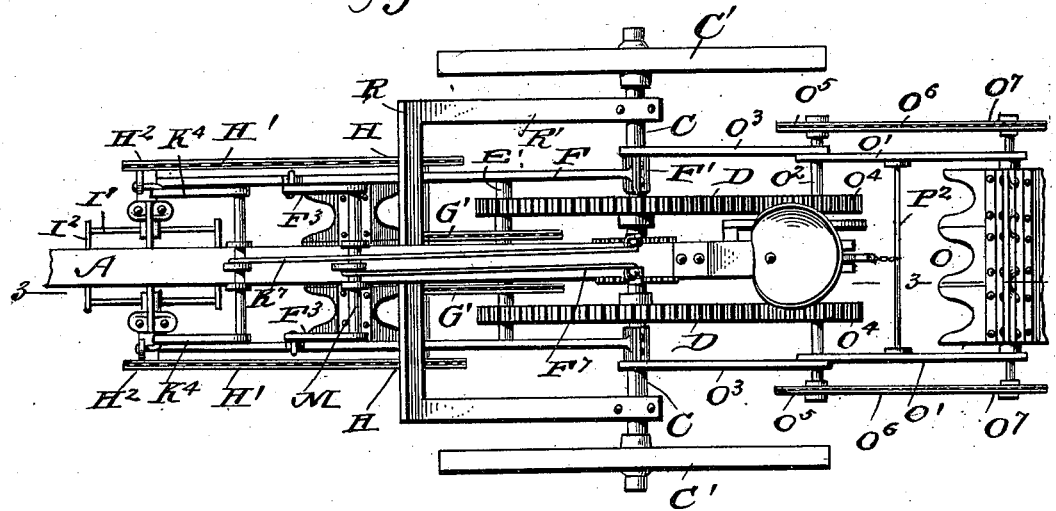

In the drawings forming part of this specification, Figure 1 is a perspective view of a beet-harvester constructed in accordance with my invention. Fig. 2 is a top plan view. Fig. 3 is a longitudinal section on the line 3 3 of Fig. 2. Fig. 4 is a section on the line 4 4 of Fig. 3. Fig. 5 is a detail section taken on the line 5 5 of Fig. 3, certain parts being omitted for clearness of illustration. Fig. 6 is a detail view of the rotary hoe or digger. Fig. 7 is a detail perspective view of the means for holding the rear hoe or digger in an elevated position.

In constructing a beet-harvester in accordance with my invention I employ a central draft-beam A, upon the rear end of which is arranged the seat A', and depending from the said draft-beam, adjacent to its rear end, is a journal-bracket B, in which is journaled the axle C, having the ground-wheels C' arranged upon its outer ends. Gear-wheels D are rigidly mounted upon the axle C upon opposite sides of the depending journal-bracket B, said gears meshing with pinions E, mounted upon the shaft, which is journaled between the side beams F, said side beams having boxes F' at their rear ends, by means of which the side beams are pivotally connected to the axle C, the forward ends of said beams being supported by means of the hanger-rods $F^2$, which are connected to arms $F^3$, mounted upon the ends of a rock-shaft $F^4$, carrying a rocking arm $F^5$, connected to a hand-lever $F^6$ by means of a rod $F^7$, so that by shifting the lever back and forth the side beams can be raised or lowered, as desired. Sprocket-wheels G are mounted upon the shaft E', and traveling around the said sprocket-wheels are the sprocket-chains G', which also pass around the sprockets $G^2$, mounted upon the shaft $G^3$, which is journaled between the upright extensions of the side beams, as most clearly shown in Figs. 1 and 3, the sprocket-wheels $G^2$ being arranged intermediate of the ends, and upon the ends of the shaft $G^3$ are the sprocket-wheels H, around which travel the sprocket-chains H', said chains H' also passing around the sprocket-wheels $H^2$, which are mounted upon the end of the cutter-shaft I, said cutter-shaft having a series of arms I' radiating therefrom and carrying knives $I^2$ for the purpose of cutting off the tops of the beets. The shaft I turns in boxes K, which are vertically adjustable in the slots K', produced in the upright extensions at the forward ends of the beams F, and connecting the upper ends of the said slotted extensions is a yoke $K^2$. Hanger-rods $K^3$ are attached to the vertically-adjustable box K, the upper ends of said hanger-rods being connected to the arms $K^4$, which are arranged upon the ends of the rock-shaft $K^5$, connected with the lever $K^6$ by means of a rod $K^7$, so that by throwing the hand-lever $K^6$ back or forth the box K, and consequently the rotary cutter, is raised or lowered, as desired. It will thus be seen that as the harvester is moved forwardly the gear-wheels D, meshing with the pinions E, will rotate the shaft E' and drive the sprockets and chains, which in turn will rotate the cutter at the forward end of the harvester, thereby cutting off the tops of the beets.

In practice I prefer to arrange shovel-points L adjacent to the forward ends of the side beams for the purpose of loosening the earth prior to the introduction of the rotary hoe or digger. This rotary hoe or digger comprises a tubular sleeve M, having longitudinal arms M', to which the toothed hoe or digging blades M² are attached. The tubular sleeve M is rigidly mounted upon the shaft N, carrying sprocket-wheels N'. This shaft is journaled between the side members F adjacent to the angle thereof, said side members being made slanting or inclined for a portion of their length and horizontal for the remaining portion, the horizontal portion being arranged at the front. Sprocket-wheels N' have drive-chains N² operating thereon, said chains being driven by sprocket-wheels N³, mounted upon the outer ends of the shaft E', so that simultaneously with the operation of the cutter-bar the rotary hoe or digger will be operated. By raising or lowering the said side beams the depth to which the hoe or digger will enter the ground can be regulated. Ordinarily one rotary hoe or digger is sufficient to dig the beet from the earth; but in case a second application of the hoe or digger should be required I make provision for one at the rear end of the machine, said hoe being identical in construction with the forward one, the shaft of said hoe O being journaled between the rearwardly-projecting beams O', which are connected to a shaft O², journaled at the rear ends of fixed beams O³, motion being imparted to the shaft O² by means of pinions O⁴, mounted thereon and which mesh with the main drive-gears D. The shaft O² carries sprocket-wheels O⁵ at its outer end, which drive the chains O⁶, which rotate the hoe or digger, the shaft of said hoe having sprocket-wheels O⁷, around which chains O⁶ pass. When the rear hoe is not in use, the beams O' can be elevated, and for this operation I employ a hand-lever P, pivoted at the rear end of the beam A and having a chain P' attached thereto, which is connected at its lower end to a cross-rod P², connecting the side beams O', and a depending notched bar Q, pivoted to the side of the beam A, is adapted to engage the cross-rod P² and hold the rear beams O' and rear hoe in an elevated position, as most clearly shown in Figs. 1 and 3. A cross-beam R is attached to the under side of the main draft-beam A, and brace-beams R' are connected to the outer ends of said cross-beam R, the rear ends of said brace-beams having bearings in which the axle turns.

It will thus be seen that I provide a simple and efficient construction of beet-harvester by means of which the tops of the beets are first cut off, the ground about the beets loosened, and finally the beets themselves extracted from the ground by means of the rotary hoes or diggers.

Having thus fully described my invention, what I claim as new, and desire to secure by Letters Patent, is—

1. A beet-harvester comprising a suitable supporting-frame, a rotary cutter arranged at the forward end of said frame, and a rotary hoe arranged adjacent to the forward end of the frame, and at a point in the rear of the cutter, and means for simultaneously rotating the cutter and hoe, substantially as described.

2. In a beet-harvester the combination with a suitable supporting-frame, of a rotary cutter adjustable at the forward end, the shovel-points arranged adjacent to the forward end of the frame, and the rotary hoe arranged at the rear of the cutter and shovel-points, and means for simultaneously rotating the cutter and hoe, the supporting-frame being adjustable, substantially as described.

3. In a beet-harvester, the combination with the main beam, of the operating-axle journaled beneath the same, a supporting-frame adjustable upon the said axle, the adjustable rotary cutter journaled at the forward end of the frame, the rotary hoe journaled in the frame to the rear of the rotary cutter, and operating means carried upon the axle and frame for the purpose of simultaneously rotating the cutter and hoe, substantially as described.

4. In a beet-harvester, the combination with the main supporting-frame, of the rotary cutter and hoe journaled in said frame, the supplemental supporting-frame arranged at the rear of the main frame and carrying a rear hoe and means for simultaneously operating the cutter and the front and rear hoes, substantially as shown and described.

5. In a beet-harvester, the combination with a main beam, of the axle journaled beneath the same, a main supporting-frame adjustably connected to an axle and provided with means for adjusting the same, the rotary cutter adjustably arranged at the forward end of the main frame and provided with means for adjusting the cutter vertically, the supplemental frame, the rotary hoe journaled adjacent to the forward end of the main frame, the supplemental hoe journaled at the rear end of the supplemental frame, means for simultaneously operating the cutter, and front and rear hoes, the lever and chain for elevating the supplemental frame and the notched bar for holding the said supplemental frame elevated, substantially as shown and described.

ARTHUR EDWARDS.

Witnesses:
R. N. EDWARDS,
C. GROSS.